2,871,459
		Patented Jan. 27, 1959

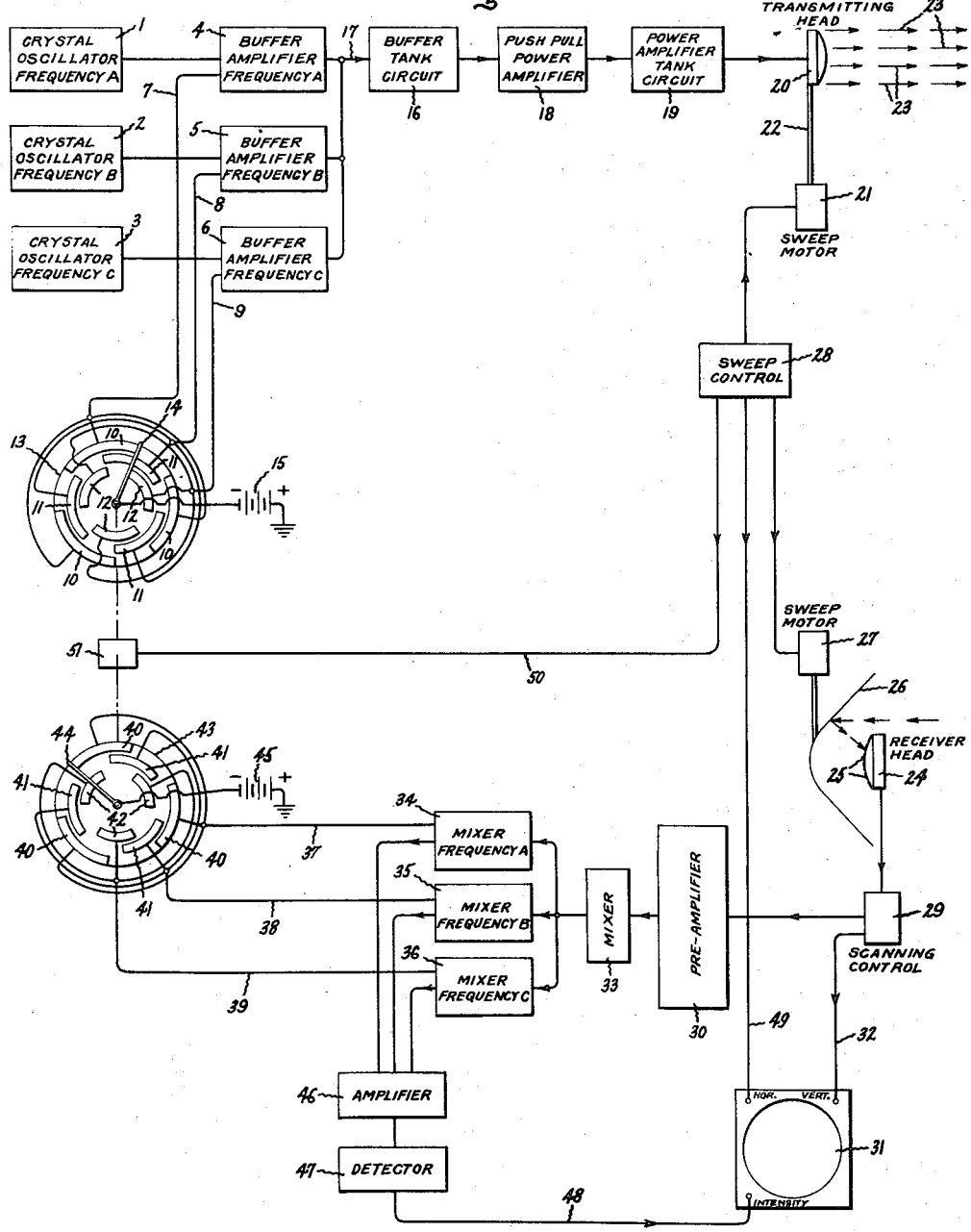

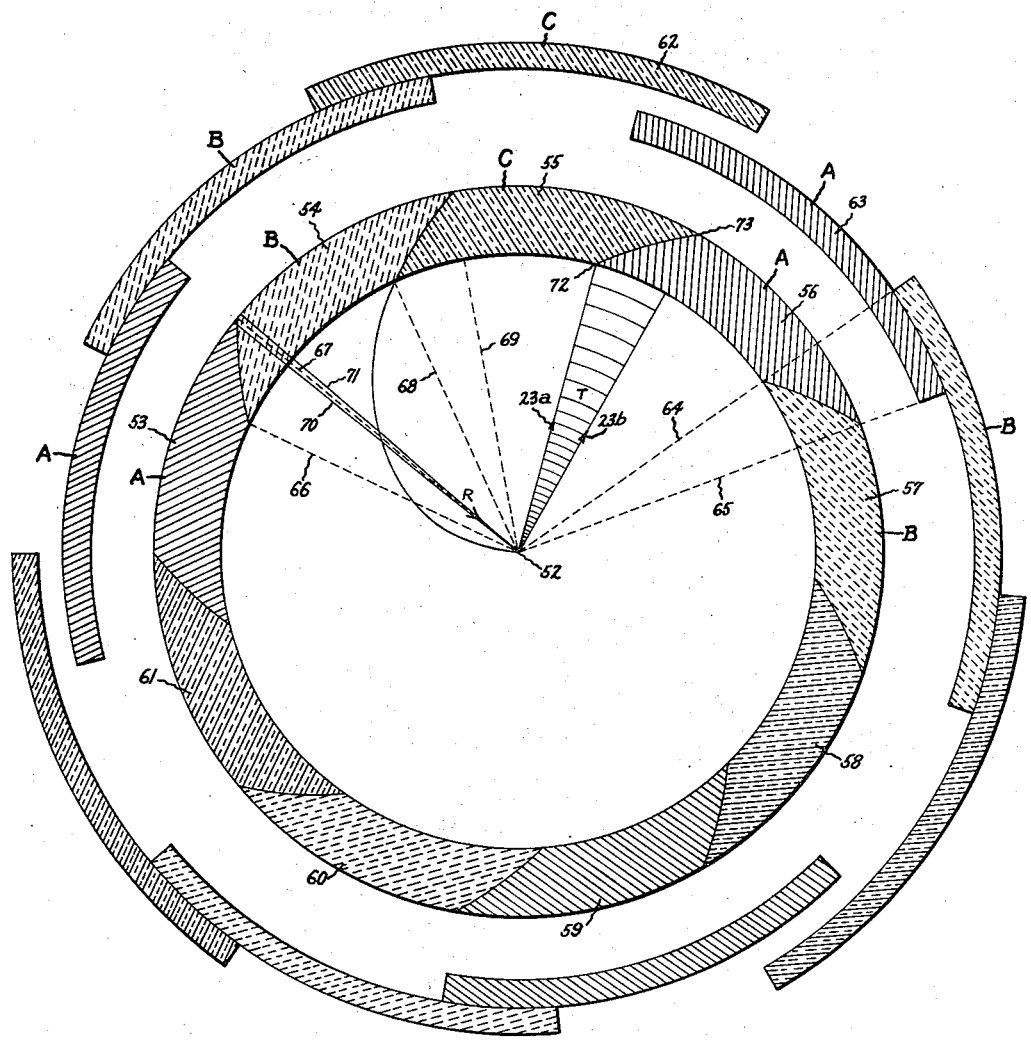

2,871,459

SUBMERGED OBJECT LOCATING

Theodore M. Berry, Schenectady, N. Y., assignor to General Electric Company, a corporation of New York Application May 6, 1946, Serial No. 667,527

18 Claims. (Cl. 340—3)

This invention relates to a submerged object locating system.

More particularly the invention is directed to a system for submerged object locating wherein at least three frequencies of supersonic wave transmission are utilized.

An object of the invention is to provide a method for locating submerged objects through the use of supersonic waves wherein undesired coupling between a receiver and transmitter may be eliminated, and wherein reverberations and undesired reflections may be reduced to a minimum.

A further object of the invention is to provide a method for locating submerged objects within a desired zone wherein continuous transmission of supersonic waves is practicable without direct coupling between transmitter and receiver, without reverberations or reception of echoes from objects outside of a desired zone, and without blind spots in the desired zone.

An additional object of the invention is to provide apparatus for submerged object locating adapted for the use of three periodically changed frequencies.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawings in which Fig. 1 is a diagram of apparatus embodying the invention and Fig. 2 is an explanatory diagram illustrating the operation.

An important aspect of this invention resides in the use of waves or energy of at least three different carrier frequencies in locating submerged objects. It is possible by the use of three frequencies to eliminate direct coupling, reverberations, and blind spots which may result from the use of a submerged supersonic transmitter and echo receiver. By switching between three transmitter frequencies and arranging the receiver sensitivity so as to periodically reject waves of each of these three frequencies, it is possible to determine accurately the location of objects in a predetermined zone without undesired interferences or erroneous responses due to direct coupling or reverberations from objects outside the desired zone. The use of three frequencies permits rejection by the frequency-sensitive receiver of waves of the frequency during the time when direct coupling with the transmitter is possible and, in addition, desensitization of the receiver for one of the remaining two frequencies during the period immediately after transmission of that frequency for the length of time during which undesired reflections or reverberations could be received. However, the receiver may be continuously sensitive to the one or two frequencies of energy reflected to the receiver from objects in the desired zone at any one time. The desired zone may be a generally annular area of an ocean bottom, or a three-dimensional volume surrounding the receiver and transmitter, or of any other configuration which may result from the particular positioning and operating sequences of the transmitter and receiver in a particular application.

The apparatus shown in Fig. 1 comprises three crystal oscillators, 1, 2, and 3, for operation respectively at three frequencies, A, B and C, preferably differing from each other by a small percentage such as less than ten percent. Crystal oscillator 1 is connected to control oscillations in buffer amplifier 4, oscillator 2 being similarly coupled to buffer amplifier 5 and oscillator 3 to buffer amplifier 6. Each of these buffer amplifiers is arranged to be disabled through the provision of connections 7, 8 and 9 respectively to conducting segments 10, 11 and 12 of commutator 13, brush 14 being arranged to provide a highly negative potential from battery 15 to each of the buffer amplifiers in sequence. The negative potential provided on conductor 7, 8 or 9 by brush contact with the appropriate segment may be conveniently applied to the grid of one of the tubes of the corresponding amplifier to drive the grid far beyond cut-off so as, in a well known manner, to disable the amplifier. The output circuits of the three buffer amplifiers are interconnected and feed buffer tank circuit 16 through conductor 17. The tank circuit 16 is relatively broadly tuned to pass frequencies A, B, and C, rejecting frequencies outside of the range represented thereby. The tank circuit feeds the push-pull power amplifier 18 which in turn feeds a second tank circuit 19, tuned for a band-pass similar to that of tank circuit 16. The output of tank circuit 19 is connected to energize a crystal transmitting element, or series of elements, which comprises a transducer of a type suitable for submerged supersonic wave transmission, indicated in the drawing as crystal transmitting head 20. The transmitting head is arranged to transmit a supersonic beam of carrier frequency energy of predetermined angular breadth, and is adapted for rotation about a desired axis under the control of a suitable motor 21 through a driving shaft 22. For purposes of this application, carrier frequency is defined as the frequency of the waves or energy transmitted by head 20 as distinguished from the rate at which these frequencies, for example A, B, C of Fig. 2, are changed under control of commutator 13. The beam of supersonic waves transmitted by transmitting head 20 is indicated by arrows 23. Reflected waves are received by a receiving head 24 comprising a series of crystal elements 25 as a receiving transducer arranged in front of a preferably parabolic reflector 26. It will generally be most practical because of physical considerations to mount the receiver head relatively close to the transmitter head, and it will be assumed herein that they are so arranged except where otherwise noted. The reflector serves to focus reflected wave energy, waves, reflections or echoes, received within a narrow directional band or cone toward the series of crystal elements, and is arranged to sweep or scan the same zone that has been covered by the sweep of the transmitting head, sweep motor 27 being provided to rotate the reflector and head of crystal elements. Sweep control 28, which may be an automatic or manually operated selsyn transmitter, is arranged for the synchronized control of sweep motors 21 and 27, which may be selsyn receivers. Other means for providing synchronized sweep may be substituted, such as direct mechanical coupling. For purposes later explained, the sweep or scan of parabolic reflector 26 is made to lag behind the sweep of the transmitting head 20 by a predetermined number of angular degrees. Each of the crystal receiving elements in the series 25 is preferably connected to a crystal scanning control device 29 which operates to furnish the signal from each of the elements in turn to preamplifier 30, while also controlling the vertical sweep of cathode ray tube 31 through conductor 32, so that signals from any one element appear on only one vertical line on the cathode ray tube screen. Other means for visual or aural presentation of the signals may be substituted if desired. Signals provided preamplifier 30 are amplified and furnished to relatively broadly tuned mixer 33, the output of which is coupled to three sharply tuned mixer circuits 34, 35 and 36 tuned respectively to frequencies A, B and C. Each of these mixers is adapted to be disabled by a negative potential on conductors 37, 38 and 39 respectively connected to segments 40, 41 and 42 of commutator 43, brush 44 being arranged to connect each segment sequentially to the negative terminal of battery 45. Brushes 14 and 44 are preferably arranged for rotation over commutators 13 and 43, respectively, and are suitably synchronized, such as by the direct mechanical coupling indicated by the broken lines, so as to cause mixer 34, tuned to frequency A, to be cut off during the time of operation of buffer amplifier 4 and for a predetermined period thereafter, but so as to be operative during the latter part of the period of operation of buffer amplifier 5 and for the whole period of operation of buffer amplifier 6. In like manner mixer 35 is disabled during the period of operation of buffer amplifier 5 and the first portion of the period of operation of buffer amplifier 6, being operative throughout the remainder of the period of operation of amplifier 6 and throughout the period of operation of amplifier 4. Mixer 36 is similarly arranged so as to be inoperative throughout the period of operation of amplifier 6 and a portion of the period of operation of amplifier 4, but to be operative during the latter part of the period of operation of amplifier 4 and all of the period of operation of amplifier 5. The output circuits of mixers 34, 35 and 36 are interconnected and fed to amplifier 46 which provides amplified signals to detector 47. The output of the detector is applied through conductor 48 to control the intensity of the cathode ray beam of cathode ray tube 31 in a well known manner. Conductor 49 from sweep control device 28 provides signals to suitable apparatus associated with cathode ray tube 31 for controlling the horizontal sweep of the cathode ray beam. Conductor 50 is arranged to furnish signals from the sweep control device 28 to a suitable element 51, such as a selsyn receiver, adapted to synchronize the rotation of brushes 14 and 44 with the sweep of the transmitting and receiver heads and the horizontal cathode ray beam sweep of cathode ray tube 31.

The operation of the apparatus described in connection with Fig. 1 may be best understood with reference to the diagram of Fig. 2. It will be assumed that the transmitting head and receiver reflector and receiver head of the apparatus are located at a point 52 in Fig. 2, in the center of the zone in which it is desired to located submerged objects. The desired search zone is indicated by the shaded areas 53 through 61 inclusive in Fig. 2 and for convenience in discussion it will be assumed to be an annular area. From the following discussion, however, the operation of the apparatus for the more usual application wherein the search zone is a volume rather than a flat area will be apparent. It is further assumed for the purposes of explanation that the transmitter and receiver heads are located close together with respect to the distances to the search zone, as previously mentioned. The transmitting head is indicated as transmitting an energy beam defined by arrows 23a and 23b which is 14½ degrees in breadth, the beam being rotated or swept in a direction shown as clockwise on the drawing. At the instant corresponding to the direction of the transmitter beam shown, indicated by arrows 23a and 23b, the transmission of frequency C is being abruptly stopped and the transmission of frequency A abruptly initiated, as indicated by the shaded areas 62 and 63 respectively. Transmission of frequency A will continue until the beam from the transmitter head has rotated into the position indicated by dotted lines 64 and 65, at which point the transmission of frequency A will be abruptly discontinued and transmission of frequency B will be initiated. Prior to the instant corresponding to the beam direction indicated by arrows 23a and 23b, the transmitter has rotated from the position indicated by dotted lines 66 and 70 to the position indicated by dotted lines 68 and 69 while transmitting waves of frequency B, while from the position indicated by dotted lines 68 and 69 to the position indicated by arrows 23a and 23b, the transmitter has transmitted frequency C. Consequently the area between dotted lines 66 and 69 has been swept by a transmitted beam of frequency B and the area between dotted line 68 and arrow 23b by waves of frequency C. The receiver head 24 and parabolic reflector 26 are aligned, when the transmitter is directed as indicated by arrows 23a and 23b, to the final portion of the area 53 swept by the transmitter at frequency A. At this point the receiver frequency sensitivity is so adjusted, by disabling mixer 34 of Fig. 1, that the receiver will be made insensitive to frequency A at which the transmitter is just beginning to sweep area 56. Mixer 35, made operative at the instant the receiver reflector was aligned in the direction indicated by dotted line 66, will continue operative until the direction of the reflector coincides the direction indicated by dotted line 69. The shaded bands 62, 63 and similar bands in Fig. 2 indicate the frequencies at which transmission takes place in these directions from point 52, as well as the directions for which the receiver is sensitive to each frequency. The parabolic reflector 26 provides a highly directional characteristic so that the receiver head receives signals only from the relatively narrow angular direction indicated by lines 70 and 71, dotted line 67 indicating the center of the angular or conical band of received signals. This band can be made as narrow as one or two degrees for the relatively weak signals which are reflected from objects in the area being investigated, corresponding to shaded portions 53 through 61, but because of the much higher intensity involved, direct coupling or reverberations caused by near-by objects or disturbances in the surrounding medium would be effective to energize the receiver crystal elements despite the directional characteristics of the reflector. It is therefore necessary to disable the receiving apparatus for frequency A from the instant the transmitter frequency is switched to frequency A, if the transmitter and receiver are close together, and until after a predetermined delay period following transmission thereof.

Under the exemplary conditions of operation described and shown in Fig. 2, the angle of lag of the receiver direction behind the lagging edge of the transmitter beam indicated by arrow 23a is 65½ degrees, and the lag angle of the receiver direction behind the leading edge of the beam (arrow 23b) is 80 degrees. The receiver direction will coincide with the direction indicated by arrow 23a at the instant a wave transmitted from point 52 could travel in the direction of arrow 23a, reach point 72, 900 feet away, and return to point 52, if the wave toward point 72 started at the instant indicated by the positions of the transmitter and receiver shown in the figure. A wave starting at this instant traveling along the direction indicated by arrow 23b would reach point 73 and return to point 52 as the receiver direction, and at some later time, coincide with the direction indicated by arrow 23b. Portions of the transmitted beam between arrows 23a and 23b would have had time to reach other portions of the left hand end of area 56 by the time the receiver had rotated into a corresponding direction. Since the instant corresponding to the direction of the transmitted beam indicated by arrows 23a and 23b in Fig. 2 is the start of transmission of frequency A, and since the beam rotates clockwise thereafter, supersonic energy will be directed toward point 72, along arrow 23a, for a very short time, whereas supersonic energy of frequency A will be directed toward point 73 for the length of time necessary for the transmitter head and the transmitted beam to rotate 14½ degrees. Points between the arrows 23a and 23b will be swept for an increasing length of time between the minimum of that for the direction of arrow 23a, toward point 72, to the maximum for the direction of arrow 23b, toward point 73. Because of the substantially constant velocity of the supersonic energy of any one frequency, it will be apparent that the width of the area as measured by the distance from the transmitter and receiver at point 52, from which reflections will be received depends upon the length of time during which waves are transmitted in the direction under consideration. In the example for which Fig. 2 is applicable, for instance, the receiver direction must coincide with the direction of a reflecting object a predetermined time interval after the supersonic energy has been transmitted toward that object, the time interval being determined by the length of time required for the transmitted energy to reach the object and return to point 52. The time interval will be proportional to the distance to the object and return, and will, in the example under discussion, be that for the supersonic energy to travel 1800 feet, that is from point 52 to the inner boundary of the shaded area 900 feet away, and return, the interval being the same as that during which the receiver and transmitter rotate 65½ degrees. The time interval required for the energy to travel 2200 feet will be the length of time required by the receiver to rotate 80 degrees. When the receiver direction has rotated to correspond to the direction of arrow 23b, the leading edge of the transmitted beam will have furnished supersonic energy toward point 73 at the earlier time necessary for the energy to have reached point 73 and returned to point 52, and the lagging edge of the beam will have furnished energy in the direction of point 73 at a time just early enough for the energy to have reached the inner edge of the area along the direction of arrow 23b and to have returned as the receiver direction coincides therewith. All that part of area 56 lying between the curved line connecting points 72 and 73 and the broken line 64 will be swept by supersonic energy of frequency A in such manner that any point in this portion of area 56 will be subjected to or bathed by the energy for a length of time equivalent to 14½ degrees of transmitter rotation, so that the receiver will be aligned with any point between the inner circle, at 900 feet, and the outer circle, at 1100 feet, at a time during which echoes therefrom will be received at point 52. Reflections from any object more than 1100 feet from point 52 will not have time to reach point 52 by the time the receiver direction is toward that object, whereas a reflection from an object closer to point 52 than 900 feet will have passed point 52 before the receiver direction coincides with the direction of such an object.

Operation in accordance with that shown in Fig. 2 is exemplary only and modification of the constants can be made to provide for scanning zones lying between boundaries removed from the transmitter and receiver by greater or less distances. It will be readily apparent, for instance, that increasing the breadth of the transmitted beam from 14½ degrees to 29 degrees will permit location of objects lying between 800 and 1200 feet from point 52. Increasing the angle of lag of the receiver behind the transmitter beam will increase the distance of the inner and outer boundaries of the area that will be covered. It will be found necessary to adjust the angular degrees of sweep during which transmission of a single frequency takes place for operation at different distances, or for different lag angles of the receiver direction or for different sweep rates. It will be possible to cover any given area without direct coupling, reverberations, blind spots or signals reflected from outside of the desired zone, by the use of the method outlined above. It will be found to be possible to always desensitize the receiver to prevent direct coupling with the transmitter (which would be during approximately the period of transmission at each frequency if the transmitter and receiver are close together physically) and in addition to maintain desensitization for the period thereafter during which undesired signals could be received, whereas the system still operates to receive a maximum of intelligence covering the location of objects in any desired zone. These advantages cannot be realized by the use of less than three transmitter frequencies without blind spots in the zone in which objects are to be located. It would be possible, of course, to achieve operation with the advantages outlined by the use of four or more frequencies, although the apparatus would be more complicated.

When it is desired to operate the transmitter and receiver at a distance from each other, my invention is applicable in that it is contemplated that the receiver will be maintained sensitive to frequency A, for example, from the instant following the termination of a first transmission at frequency A at which undesired signals at the receiver cease, such as reflected energy from objects inside the desired zone, until the instant at which direct coupling could start. The latter instant, it will be apparent, is delayed after the initiation of the next transmission period for frequency A by a length of time determined by the time required for the energy transmitted to reach the receiver directly. This will depend upon the speed of the energy in the medium involved and the distance separating the transmitter and receiver.

It has been found advantageous to utilize relatively high frequency supersonic waves in underwater object locating, such as for instance, frequencies of 710 to 750 kilocycles, which would be suitable for object locating up to approximately 1000 feet distance or frequencies of 210, 230 and 250 kilocycles for location of objects further than 1000 feet. It will be apparent that the apparatus may be used for any desired frequency, and that switching arrangements can be incorporated to enable selection of frequency bands to meet different conditions.

Further details of equipment usable in practising the present invention are described and claimed in the copending application Serial No. 667,526 of Billy R. Shepard and Henry C. Maulshagen entitled "Control Circuit," filed May 6, 1946, and assigned to the assignee of the present application, now U. S. Patent No. 2,818,505, granted Dec. 31, 1957.

Since numerous modifications of the apparatus and method described will be apparent, wherein, for instance, the transmission may be blanked entirely for portions of the full rotation, one or more transmission periods may be omitted, more than one transmitter or receiver head may be provided, or a non-directional transmitter or receiver employed, it is not intended that I be limited to the method and apparatus specifically described above, but that the invention be considered as limited only by the scope of the appended claims.

What I claim as new and desire to secure by Letters Patent of the United States is:

1. An arrangement for operating an object locator of the type comprising a plural frequency transmitter for transmitting energy toward objects within a zone to be examined and a plural frequency echo receiver arranged to receive echoes from objects within said zone, which comprises means for transmitting energy of given carrier frequency toward said zone during a predetermined finite number of successive appreciable time intervals and for changing the carrier frequency of said transmitted energy for each successive interval, and means for controlling the frequency sensitivity of the receiver to render it insensitive to energy of the carrier frequency being transmitted at any instant.

2. An arrangement for operating a submerged object locator of the type comprising a plural frequency transmitter for transmitting energy toward objects within a zone to be examined and a plural frequency echo receiver arranged to receive echoes from objects within said zone, which comprises means for transmitting energy of given carrier frequency toward said zone during a predetermined finite number of successive equal time intervals and for changing the carrier frequency of said transmitted energy for each successive interval, and means for controlling the frequency sensitivity of the receiver to render it insensitive to energy of the carrier frequency being transmitted at any instant.

3. An arrangement for operating a submerged object locator of the type comprising a multiple frequency transmitter for transmitting energy toward objects within a zone to be examined and a multiple frequency echo receiver arranged to receive echoes from objects within said zone, which comprises means for transmitting energy of given carrier frequency toward said zone during a predetermined finite number of successive time intervals and means for changing the carrier frequency of said transmitted energy for each successive interval, and means for controlling the frequency sensitivity of the receiver to render it successively insensitive to energy of each one of the transmitted carrier frequencies after initiation of the transmission thereof for the time required for energy from said transmitter to reach said zone and be reflected to said receiver.

4. An arrangement for operating a submerged object locator of the type comprising a multiple frequency transmitter for transmitting energy toward objects within a zone to be examined and a multiple frequency echo receiver arranged to receive echoes from objects within said zone, which comprises means for transmitting energy of at least three different frequencies in continuously repeating sequence whereby intermissions are provided in the transmission of each of said frequencies during transmission at others of said frequencies, and means for receiving energy at one of said frequencies during a time period ending at substantially the instant at which direct coupling between the transmitter and receiver could occur from the next transmission at said one of said frequencies.

5. An arrangement for operating a submerged object locator of the type comprising a multiple frequency transmitter and echo receiver, which comprises means for controlling said transmitter so as to transmit a continuously repeated sequence of at least three different frequencies whereby intermissions in the transmission of each of said frequencies are provided during transmission of others of said frequencies, each intermission in transmission of each one of said frequencies being equal to at least twice the transmission time for that frequency, and means for controlling said receiver to render it sensitive to each of said frequencies at least during the latter half of the intermission for that frequency and insensitive to each of said frequencies at least during transmission thereof.

6. An arrangement for operating a submerged object locator for locating objects within a zone of the type comprising a supersonic transmitter and a directional echo receiver, which comprises means for controlling said transmitter to sweep an energy beam of a first predetermined frequency through a first desired sweep angle toward said zone, means for rotating said receiver to scan through said first angle at a predetermined lagging angle behind said beam sweep, said lagging angle being determined by the time required for said energy to reach said zone and be reflected to said receiver, means for tuning said receiver to render it sensitive to said first frequency during scan of said first angle whereby echoes at said first frequency from objects in the portion of said zone within said angle are received, means for tuning said receiver to render it insensitive to said first frequency at the end of said scan, means for repeating the steps a desired number of times for said number of adjacent consecutive sweep angles at different respective frequencies, and means for starting a next repetition of said steps at said first frequency as soon as transmission at said first frequency may be reinitiated without direct coupling to said receiver while said receiver is scanning said first of said desired angles.

7. In combination, means including a directional transducer for selectively transmitting energy at least at three different supersonic frequencies, means for rotating said transducer, a receiver selectively sensitive to said frequencies, means responsive to the rotational position of said transducer for selecting the transmitted frequency in repeating sequences of said three frequencies and for selectively sensitizing said receiver for each of said frequencies in the same sequence and for selectively desensitizing said receiver for each of said frequencies in the same sequence for predetermined intervals, the start of each of said intervals being delayed after initiation of transmission at each of said frequencies respectively by a time appreciably greater than the time of direct transmission from said transducer to said receiver.

8. A submerged-object locator comprising the combination of directional transmitting means for projecting a relatively narrow beam of supersonic energy of selectively predetermined frequencies in a liquid medium, means for sweeping said beam through a series of three consecutive angles of not more than 120° each, means for shifting the frequency of transmission between three predetermined frequencies to sweep each of the three angles at a different one of said frequencies, directional echo receiving means adapted to scan said angles at a predetermined angular lag behind said transmitter sweep and means for tuning said receiving means to each one of said transmitted frequencies in turn as the direction of said receiving means corresponds to a direction within said projected beam at the initiation of sweep at each respective frequency.

9. A submerged-object locator comprising the combination of directional transmitting means for projecting a relatively narrow beam of supersonic energy of predetermined frequency in a liquid medium, means for sweeping said beam through repeated series of at least three consecutive angles of not more than 120 degrees each, means for sequentially shifting the frequency of transmission during each series between a number of predetermined frequencies equal to the number of said angles to sweep each angle in each series at a respectively different one of said frequencies, directional echo receiving means adapted to scan said angles at a predetermined angular lag behind said transmitter beam, and means for rendering said receiving means ineffective for one of said frequencies for a predetermined interval at least equivalent in length to the transmission period for said one of said frequencies, said means being arranged to start said interval at the time after initiation of said transmission period at which direct reception of said transmission would otherwise occur.

10. In a submerged object locator comprising a transmitter and an adjacent echo receiver, the combination of means for sweeping a transmitted beam of supersonic energy through a series of three angles, means for shifting the frequency of said beam to cause each of said angles to be swept at a different one of said frequencies, said receiver being responsive to echoes at said frequencies received from remote submerged objects, and means for rendering said receiver periodically unresponsive to the frequency at which each angle is swept at least during the sweep of the beam therethrough.

11. In combination, a supersonic wave transmitter, means for causing said transmitter to sweep a beam through a predetermined number of predetermined angles in an equivalent number of corresponding approximately equal time intervals, means for shifting the frequency of said beam for each successive interval, a directional frequency-sensitive supersonic echo receiver arranged to scan through one of said angles starting a predetermined time after termination of the transmitter beam sweep thereof and continuing during a length of time equivalent to at least the time interval for said sweep but not more than the total of said time intervals less an interval equivalent to said time interval for said sweep, and means to sensitize said receiver for the frequency transmitted in the sweep of said one angle at the start of said scan and to desensitize the receiver for said last frequency at the termination of said scan.

12. In combination a directional transmitting transducer, a plurality of oscillator circuits operable at different frequencies, means for selectively applying the output of each of said oscillator circuits to said transducer in sequence, means associated with said last means for rotating said transducer, a rotatable directional frequency-sensitive receiver, means associated with said transducer rotating means for rotating said receiver, means for desensitizing said receiver for each of said frequencies in sequence for respective time periods each period extending at least throughout the initial period of operation of said transducer at each of said frequencies in order to minimize direct coupling between said transducer and said receiver at each of said frequencies.

13. In a submerged object locator, the combination of a directional wave transmitter, a directional receiver, said transmitter and receiver being oriented in different directions, means for rotating said transmitter and receiver in synchronism to scan a remote zone for objects to be located, and means to change the frequency of the transmitted wave between successive intervals, the angle between the directions in which said transmitter and said receiver are oriented and the rate of rotation thereof being related to the time of said transmitted wave frequency change such that an echo of a particular one of said frequencies from an object in said zone is received in said receiver during transmission at a different one of said frequencies.

14. In a submerged object locator, the combination of a directional wave transmitter, a directional receiver, said transmitter and receiver being oriented in different directions, means for rotating said transmitter and receiver in synchronism to scan a remote zone for objects to be located, and means to change the frequency of the transmitted wave between successive intervals, the angle between the directions in which said transmitter and said receiver are oriented and the rate of rotation thereof being related to the time of said transmitted wave frequency change such that an echo of a particular one of said frequencies from an object in said zone is received in said receiver during a period when undesired signals of said one of said frequencies appearing at said receiver are at a minimum.

15. The combination, in a directional object locator, of a transmitter arranged to transmit wave energy having different frequencies during corresponding successive intervals toward distant zones, a receiver initially oriented in a given direction, means to rotate said receiver to scan said zones in succession, and means to change the frequency of response of said receiver from one to another of said frequencies between successive periods, the orientation of said receiver and the velocity of rotation being so related to the time of said receiver frequency response change that an echo of a particular frequency from any object in the zone being scanned produces response in said receiver during the interval of transmission at a different frequency.

16. The combination in a directional object locator, of a directional transmitter arranged to transmit a beam of energy having different frequencies for corresponding respective intervals in succession, means to rotate said transmitter to sweep a distant zone with said beam, a receiver responsive to echoes from objects within said zone, and means to change the frequency of response of said receiver from one to another of said frequencies between successive reception periods, the orientation of said transmitter and the velocity of rotation being so related to the time of said receiver frequency response change that an echo of a particular frequency from any object in said zone produces response in said receiver during the interval of transmission at a different frequency.

17. The combination, in a directional object locator of a transmitter arranged to transmit wave energy having respectively different frequencies during corresponding respective intervals in succession, a receiver oriented in a particular direction, means to rotate said receiver to scan a distant zone, and means to change the frequency of response of said receiver from one to another of said frequencies between successive reception periods, the orientation of said receiver and the velocity of rotation being so related to the time of said receiver frequency response change that an echo of a particular frequency from any object in said zone produces response in said receiver during a period related in time to an interval of transmission at said frequency during which undesired response of said receiver to signals of said frequency is at a minimum.

18. The combination in a directional object locator, of a directional transmitter arranged to transmit a beam of energy having respectively different frequencies for corresponding respective intervals in succession, means to rotate said transmitter to sweep a distant zone with said beam, a receiver responsive to echoes from objects within said zone, and means to change the frequency of response of said receiver between successive periods between said different frequencies, the orientation of said transmitter and the velocity of rotation being so related to the time of said receiver frequency response change that an echo of a particular frequency from an object in said zone produces response in said receiver during the period that interfering signals at said echo frequency are of minimum intensity at said receiver.

References Cited in the file of this patent

UNITED STATES PATENTS

| | | |
|---|---|---|
| 2,179,509 | Kietz | Nov. 14, 1939 |
| 2,371,988 | Granquist | Mar. 20, 1945 |
| 2,399,017 | Goldman | Apr. 23, 1946 |
| 2,405,134 | Brown et al. | Aug. 6, 1946 |
| 2,407,644 | Benioff | Sept. 17, 1946 |
| 2,423,024 | Hershberger | June 24, 1947 |
| 2,427,523 | Dolberg | Sept. 16, 1947 |
| 2,505,587 | Smith | Apr. 25, 1950 |
| 2,568,441 | Fyler | Sept. 18, 1951 |
| 2,676,317 | Purington | Apr. 20, 1954 |

FOREIGN PATENTS

| | | |
|---|---|---|
| 151,389 | Great Britain | Sept. 30, 1920 |
| 546,202 | Great Britain | July 2, 1942 |